United States Patent
Hayakawa et al.

(10) Patent No.: US 6,793,092 B1
(45) Date of Patent: Sep. 21, 2004

(54) DISPOSABLE CONTAINER FOR DISPOSING OF USED OIL

(76) Inventors: Warren Hayakawa, 1521 Alexander St. #1503, Honolulu, HI (US) 96822; Mark Shimabukuro, 5630 Halepa Pl., Honolulu, HI (US) 96821

( * ) Notice: Subject to any disclaimer, the term of this patent is extended or adjusted under 35 U.S.C. 154(b) by 0 days.

(21) Appl. No.: 10/440,652

(22) Filed: May 19, 2003

Related U.S. Application Data

(60) Provisional application No. 60/408,993, filed on Sep. 9, 2002.

(51) Int. Cl.[7] ................................................ B65D 1/34
(52) U.S. Cl. ...................................... 220/573; 220/571
(58) Field of Search .................................. 220/571, 573

(56) References Cited

U.S. PATENT DOCUMENTS

| | | | |
|---|---|---|---|
| 3,228,491 A | | 1/1966 | Gatsos |
| 4,709,826 A | * | 12/1987 | Wong .......................... 220/573 |
| 4,826,030 A | * | 5/1989 | Valley ......................... 220/573 |
| 4,923,052 A | * | 5/1990 | Englebert ................... 184/106 |
| 5,020,638 A | * | 6/1991 | Smith .......................... 184/106 |
| 5,316,386 A | * | 5/1994 | Moore .......................... 383/10 |
| D348,072 S | | 6/1994 | Benham |
| D358,734 S | | 5/1995 | Paskwietz et al. |
| 5,716,840 A | * | 2/1998 | Kahler et al. ................ 435/264 |
| 5,775,869 A | * | 7/1998 | Bishop ........................ 414/608 |
| 5,916,658 A | * | 6/1999 | Mohr ........................... 428/81 |
| 6,110,863 A | * | 8/2000 | Engst .......................... 502/402 |

* cited by examiner

*Primary Examiner*—Joseph Man-Fu Moy
(74) *Attorney, Agent, or Firm*—Richard L. Miller

(57) ABSTRACT

A disposable container for disposing of used oil. The container includes a housing, tin foil, an oil absorbent material, and a filter. The housing is made from cardboard and has a substantially open top and an interior. The tin foil lines the interior of the housing and prevents the used oil poured into the housing from leaking therethrough, so as to form therewith, an oil-proofed housing. The oil absorbent material fills the interior of the oil-proofed housing and absorbs the used oil poured thereon. The filter is sandwiched between the oil absorbent material and the substantially open top of the housing and filters particles in the used oil as the used oil is poured through the substantially open top of the housing.

6 Claims, 1 Drawing Sheet

DISPOSABLE CONTAINER FOR DISPOSING OF USED OIL

CROSS REFERENCE TO RELATED APPLICATIONS

The instant application is a nonprovisional application of U.S. provisional application No. 60/408,993, filed on Sep. 9, 2002, and entitled OIL DISPOSE, and it is respectfully requested that this application be accorded the benefit under 35 USC 119(e) of said U.S. provisional application.

BACKGROUND OF THE INVENTION

1. Field of the Invention

The present invention relates to a disposable container. More particularly, the present invention relates to a disposable container for disposing of used oil.

2. Description of the Prior Art

Numerous innovations for mats have been provided in the prior art that will be described. Even though these innovations may be suitable for the specific individual purposes to which they address, however, they differ from the present invention.

A FIRST EXAMPLE, U.S. Pat. No. Des. 348,072 to Benham teaches the ornamental design for an engine fluid absorbing pad.

A SECOND EXAMPLE, U.S. Pat. No. Des. 358,734 to Paskwietz et al. teaches the ornamental design for a multi-purpose mat.

A THIRD EXAMPLE, U.S. Pat. No. 3,228,491 to Gatsos teaches a drip mat for use beneath an automobile to absorb and hold grease and oil drippings comprising a substantially rectangular body portion of a size adapted to fit beneath an automobile, said body portion being multi-ply and laminated and having a top perforated layer of substantially smooth fibrous material, an intermediate layer of corrugated fibrous material, a lower layer of imperforate fibrous material and a bottom coating of grease and oil impervious plastics material, said body portion being scored transversely near its longitudinal center to facilitate folding of two half sections thereof upon each other for storage, said body portion being slit through all plies thereof at plural spaced regions along its longitudinal edges to form initially flat foldable sections hinged to the body portion and foldable downwardly therefrom and also foldable in vertical planes beneath the body portion and inwardly of the longitudinal edges thereof to form integral supporting feet thereon, said folded feet having upstanding foldable locking tabs and said body portion having through slots near and inwardly of said slits adapted to receive said tabs prior to the folding thereof, whereby said tabs upon being folded overlie the top face of said body portion and lock said feet in folded erected positions.

It is apparent that numerous innovations for mats have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a disposable container for disposing of used oil that avoids the disadvantages of the prior art.

ANOTHER OBJECT of the present invention is to provide a disposable container for disposing of used oil that is simple and inexpensive to manufacture.

STILL ANOTHER OBJECT of the present invention is to provide a disposable container for disposing of used oil that is simple to use.

BRIEFLY STATED, STILL YET ANOTHER OBJECT of the present invention is to provide a disposable container for disposing of used oil. The container includes a housing, tin foil, an oil absorbent material, and a filter. The housing is made from cardboard and has a substantially open top and an interior. The tin foil lines the interior of the housing and prevents the used oil poured into the housing from leaking therethrough, so as to form therewith, an oil-proofed housing. The oil absorbent material fills the interior of the oil-proofed housing and absorbs the used oil poured thereon. The filter is sandwiched between the oil absorbent material and the substantially open top of the housing and filters particles in the used oil as the used oil is poured through the substantially open top of the housing.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawing are briefly described as follows.

Figure 1:
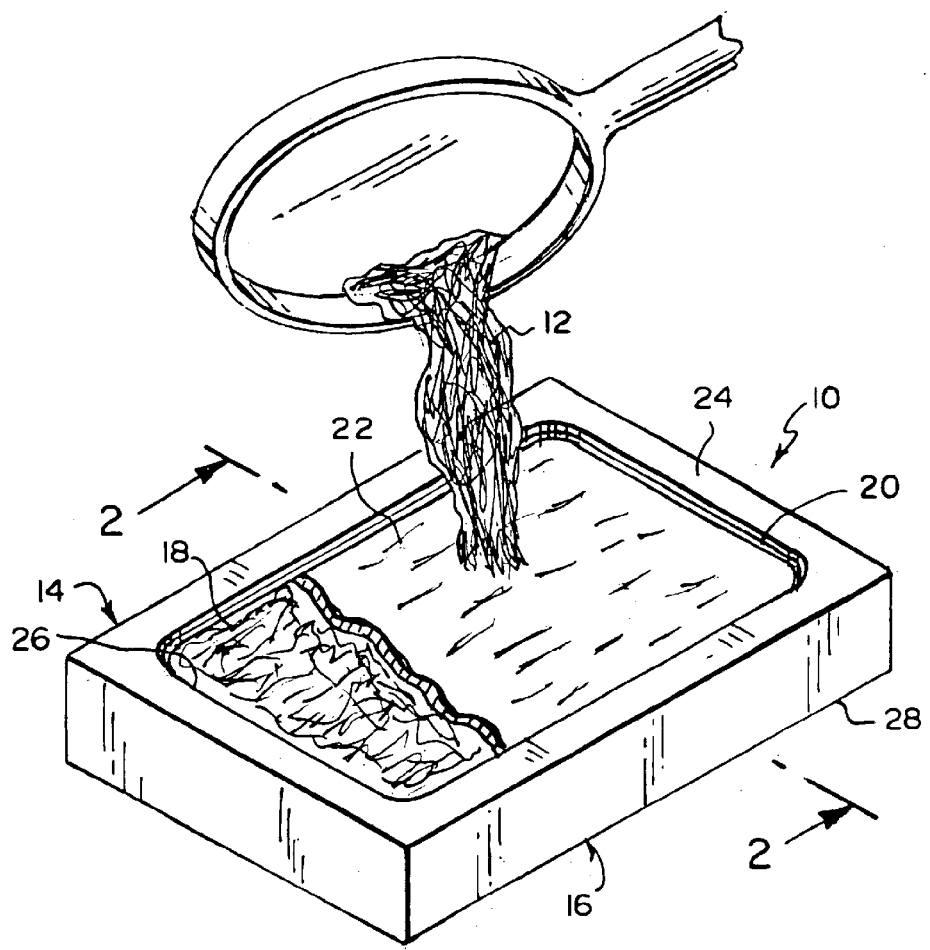
FIG. 1 is a diagrammatic perspective view of the present invention in use.

LIST OF REFERENCE NUMERALS UTILIZED IN THE DRAWING disposable container of present invention for disposing of used oil 12
used oil
body for receiving used oil 12
housing of body 12
oil absorbent material of body 12 for absorbing used oil 12 poured thereon
tin foil of body 12 for preventing used oil 12 poured into housing 16 of body 12 from leaking therethrough
filter of body 12 for filtering particles in used oil 12 as used oil 12 is poured through top 24 of housing 16
top of housing 16 of body 12 for having used oil 12 poured therethrough
interior of housing 16 of body 12
oil-proofed housing of body 12

DETAILED DESCRIPTION OF THE PREFERRED EMBODIMENT

Referring now to the figures, in which like numerals indicate like parts, and particularly to FIG. 1, the disposable container of the present invention is shown generally at 10 for disposing of used oil 12.

Figure 2:
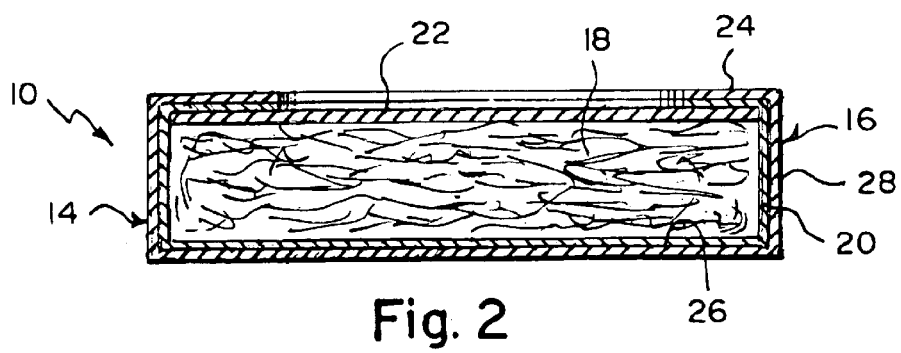
FIG. 2 is a diagrammatic cross sectional view taken along line 2-2 in FIG. 1.

The configuration of the disposable container 10 can best be seen in FIGS. 1 and 2, and as such, will be discussed with reference thereto.

The disposable container 10 comprises a body 14. The body 14 is for receiving the used oil 12.

The body 12 comprises a housing 16, an oil absorbent material 18, tin foil 20, and a filter 22.

The housing 16 is box-like, generally rectangular-parallelepiped-shaped, has a top 24 with a majority thereof being open for having the used oil 12 poured therethrough and an interior 26, and is made from cardboard.

The tin foil 20 lines the interior 26 of the housing 16 and is for preventing the used oil 12 poured into the housing 16 from leaking therethrough, so as to and form therewith, an oil-proofed housing 28.

The oil absorbent material 18 fills the interior 26 of the oil-proofed housing 28 and is for absorbing the used oil 12 poured thereon.

The filter 22 is sheet-like and is sandwiched between the absorbent oil material 18 and the top 24 of the housing 16 and is for filtering particles in the used oil 12 as the used oil 12 is poured through the top 24 of the housing 16.

It will be understood that each of the elements described above, or two or more together, may also find a useful application in other types of constructions differing from the types described above.

While the invention has been illustrated and described as embodied in a disposable container for disposing of used oil, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A disposable container for disposing of used oil, comprising a body; wherein said body is for receiving the used oil, wherein said body comprises a housing, wherein said body comprises tin foil, wherein said housing has an interior;

wherein said tin foil lines said interior of said housings; and wherein said tin foil is for preventing the used oil poured into said housing from leaking therethrough, so as to form therewith, an oil-proofed housing, wherein said body comprises an oil absorbent material, wherein said body comprises a filter, wherein said filter is sandwich between said oil absorbent material and a substantially open housings; and wherein said filter is for filtering particles in the used oil as the used oil is poured through said substantially open top of said housing.

2. The container as defined in claim 1, wherein said housing is box-like.

3. The container as defined in claim 1, wherein said housing is generally rectagular-parallepiped-shaped.

4. The container as defined in claim 1, wherein said housing is made from cardboard.

5. The container as defined in claim 1, wherein said oil absorbent material fills said interior of said oil-proofed housing; and wherein said oil absorbent material is for absorbing the used oil poured thereon.

6. The container as defined in claim 1, wherein said filter is sheet-like.

* * * * *